US012755301B2

(12) United States Patent
Heller

(10) Patent No.: US 12,755,301 B2
(45) Date of Patent: Oct. 6, 2026

(54) ATTRIBUTION SYSTEM AND METHOD FOR MOVING OUT-OF-HOME ADVERTISING

(71) Applicant: Wrapmate, Inc., Denver, CO (US)

(72) Inventor: James Sevan Heller, Solana Beach, CA (US)

(73) Assignee: Wrapmate, Inc., Denver, CO (US)

( * ) Notice: Subject to any disclaimer, the term of this patent is extended or adjusted under 35 U.S.C. 154(b) by 0 days.

(21) Appl. No.: 18/627,291

(22) Filed: Apr. 4, 2024

(65) Prior Publication Data

US 2024/0403918 A1 Dec. 5, 2024

Related U.S. Application Data

(63) Continuation of application No. 17/320,097, filed on May 13, 2021, now abandoned.

(Continued)

(51) Int. Cl.
*G06Q 30/0251* (2023.01)
*G01S 19/10* (2010.01)

(Continued)

(52) U.S. Cl.
CPC .......... *G06Q 30/0266* (2013.01); *G01S 19/10* (2013.01); *G06F 9/54* (2013.01);

(Continued)

(58) Field of Classification Search
None
See application file for complete search history.

(56) References Cited

U.S. PATENT DOCUMENTS

2012/0317205 A1* 12/2012 Lahiani ................. H04W 4/021 709/206
2016/0306813 A1* 10/2016 Meredith ............. H04W 4/029

(Continued)

OTHER PUBLICATIONS

Free Car Media, "Getting Started", retrieved from https://web.archive.org/web/20220401131745/https:/freecarmedia.com/, available on Apr. 1, 2022 (Year: 2022).*

*Primary Examiner* — Sam Refai
(74) *Attorney, Agent, or Firm* — Bradley Arant Boult Cummings LLP; Adam J. Thompson, Esq.

(57) ABSTRACT

A method for attribution determination in a system including a plurality of vehicles having exteriors configured to convey messaging to occupants of other vehicles. Communication signals including information relating to time-stamped locations of the vehicles are received. Time-stamped location data including a plurality of the time-stamped locations is provided to a mobile location data aggregator. Anonymized identifiers associated with mobile device users within exposure zones associated with the time-stamped locations are received from the mobile location data aggregator. A control set of anonymized identifiers associated with users within a geo-fenced area but not within the exposure zones is also received. A record of conversion events is compiled. The conversion events include a first set of conversion events performed by the exposed audience and a second set of conversion events performed by the control audience. An attribution metric is determined based upon the first and second sets of conversion events.

14 Claims, 11 Drawing Sheets

Related U.S. Application Data

(60) Provisional application No. 63/024,350, filed on May 13, 2020, provisional application No. 63/024,361, filed on May 13, 2020.

(51) Int. Cl.

| | |
|---|---|
| ***G06F 9/54*** | (2006.01) |
| ***G06F 16/953*** | (2019.01) |
| ***G06Q 30/0201*** | (2023.01) |
| ***G06Q 30/0204*** | (2023.01) |
| ***G06Q 30/0272*** | (2023.01) |
| ***G06Q 30/0273*** | (2023.01) |
| ***H04L 67/12*** | (2022.01) |
| ***H04L 67/52*** | (2022.01) |
| *G06Q 30/0242* | (2023.01) |

(52) U.S. Cl.

CPC ....... *G06F 16/953* (2019.01); *G06Q 30/0201* (2013.01); *G06Q 30/0205* (2013.01); *G06Q 30/0272* (2013.01); *G06Q 30/0275* (2013.01); *H04L 67/12* (2013.01); *H04L 67/52* (2022.05); *G06Q 30/0246* (2013.01)

(56) References Cited

U.S. PATENT DOCUMENTS

| | | | | |
|---|---|---|---|---|
| 2017/0213240 A1* | 7/2017 | Waldron | ............... | H04W 4/023 |
| 2019/0268743 A1* | 8/2019 | Cho | ........................ | B60Q 1/545 |
| 2020/0074501 A1* | 3/2020 | Gerard | .................. | H04W 4/021 |
| 2021/0233115 A1* | 7/2021 | Kardesler | .............. | G06V 40/10 |
| 2021/0350412 A1* | 11/2021 | Harwood | ................ | G09F 21/04 |

* cited by examiner

Visualization of a Target Vehicle With Exterior Graphic Messaging Receiving Impressions Flow Chart of Mobile Device Application to Platform System Workflow Flow Chart of Platform Impressions and Scoring Algorithm Road Segment Calculation Visualized 15 Minute Road Segment
131
15 Minute Road Segment
132
15 Minute Road Segment
133
Lane 1
Lane 2
Lane 3
Vehicle W
Vehicle X
Vehicle Z
Vehicle V
Vehicle Y
135
134
100%
100%
50%
Vehicle A
Reporting every
1/10 mile

ATTRIBUTION SYSTEM AND METHOD FOR MOVING OUT-OF-HOME ADVERTISING

CROSS-REFERENCE TO RELATED APPLICATIONS

This application is a continuation of U.S. patent application Ser. No. 17/320,097, entitled ATTRIBUTION SYSTEM AND METHOD FOR MOVING OUT-OF-HOME ADVERTISING, filed May 13, 2021, which claims priority to and the benefit of U.S. Provisional Patent Application No. 63/024,350, entitled ATTRIBUTION SYSTEM AND METHOD FOR MOVING OUT-OF-HOME ADVERTISING, filed on May 13, 2020, and U.S. Provisional Patent Application No. 63/024,361, entitled SYSTEM AND METHOD FOR RETARGETING IN A VEHICULAR ADVERTISING SYSTEM, filed on May 13, 2020, the disclosures of which are incorporated herein by reference in their entirety for all purposes.

This application is related to U.S. Pat. No. 10,373,205, entitled SYSTEM AND METHOD FOR ESTIMATING VISUAL IMPRESSIONS OF VEHICLES CONFIGURED WITH EXTERNAL GRAPHIC MESSAGING, filed Mar. 7, 2017 and issued Aug. 6, 2019, the contents of which are incorporated herein by reference for all purposes.

BACKGROUND

Businesses often attempt to increase consumer awareness by placing messaging identifying or promoting products or services on mass transit vehicles (e.g., buses). Such messaging may also be conveyed by configuring the exteriors of a business' fleet or other vehicles with text and/or graphics identifying the business and/or its products or services. However, a business entity has no way of quantifying the visual impressions of such messaging by potential consumers; that is, the business has no way of determining how many consumers actually view these messages.

Systems have been proposed for configuring vehicles with a messaging device (e.g., a display) capable of being updated with messages intended for viewing by occupants of other vehicles. In such systems the message may be changed more frequently when the system detects that the vehicle with the messaging device is being slowed by traffic. However, such systems are unable to estimate how many other vehicles are capable of viewing the messages.

U.S. Pat. No. 10,373,205, assigned to the assignee of the present application, relates a system and method for estimating visual impressions of vehicles configured with external graphic messaging. Consider that a vehicle moving along a path from one location to another, or positioned in a certain location, will be visible to occupants of other vehicles which have travelled the same path or are otherwise within the same vicinity. These vehicle occupants will be in a position to receive visual impression of the vehicle's aesthetic appearance (e.g., make, model, color, year, or vehicle messaging/advertising). The '205 patent discloses a system and method of attributing how many unique visual impressions a moving or non-moving vehicle receives for the purposes of, for example, advertising, marketing, or research.

SUMMARY

In one aspect the disclosure relates to a method for audience building for use within an attribution determination system including a plurality of vehicles having exteriors configured to convey messaging to occupants of other vehicles. The method includes receiving communication signals including information relating to time-stamped locations of the plurality of vehicles. The communication signals may be provided by user mobile devices disposed within the vehicles or by communication devices integrated with the plurality of vehicles. First time-stamped location data including a first plurality of the time-stamped locations is then provided to a mobile location data aggregator. The method further includes receiving, from the mobile location data aggregator, a first set of anonymized identifiers associated with mobile device users known to be within a first plurality of exposure zones associated with the first plurality of time-stamped locations. Each of the first plurality of exposure zones encompasses one of the first plurality of time-stamped locations and is of a first area associated with a first radius. A first set of interpolated locations between at least a subset of the first plurality of time-stamped locations may then be created. The first set of interpolated locations are then provided to the mobile location data aggregator. A second set of anonymized identifiers are received from the mobile location data aggregator. The second set of anonymized identifiers are associated with mobile device users known to be within the first radius of any of the interpolated locations. The method further includes aggregating the first set of anonymized identifiers and the second set of anonymized identifiers in order to build a first exposed audience. The first exposed audience corresponds to a union of the first set of anonymized identifiers and the second set of anonymized identifiers.

In another aspect the disclosure relates to a method for attribution determination in a system including a plurality of vehicles having exteriors configured to convey messaging to occupants of other vehicles. The method includes receiving communication signals including information relating to time-stamped locations of the plurality of vehicles where the time-stamped locations correspond to a plurality of exposure zones. The communication signals may be provided by user mobile devices disposed within the vehicles or by communication devices integrated with the plurality of vehicles. The method also includes providing, to a mobile location data aggregator, first time-stamped location data including a first plurality of the time-stamped locations. A first set of anonymized identifiers associated with mobile device users known to be within a first plurality of exposure zones associated with the first plurality of time-stamped locations are then received from the mobile location data aggregator. Each of the first plurality of exposure zones encompasses one of the first plurality of time-stamped locations and is of a first area associated with a first radius where the mobile device users known to be within the first plurality of exposure zones are included within a first exposed audience. A first control set of anonymized identifiers associated with users known to have been within a first geo-fenced area but not within the first plurality of exposure zones may then be received. The first control set of anonymized identifiers corresponds to a first control audience. A first record of conversion events may then be compiled. The conversion events may include a first set of conversion events performed by the first exposed audience with respect to the messaging conveyed by a first set of the plurality of vehicles and a second set of conversion events performed by the first control audience. At least a first attribution metric is then determined based upon the first set of conversion events and the second set of conversion events.

BRIEF DESCRIPTION OF THE DRAWINGS

The present disclosure is more fully appreciated in connection with the following Detailed Description taken in conjunction with the accompanying drawings. The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Figure 1:
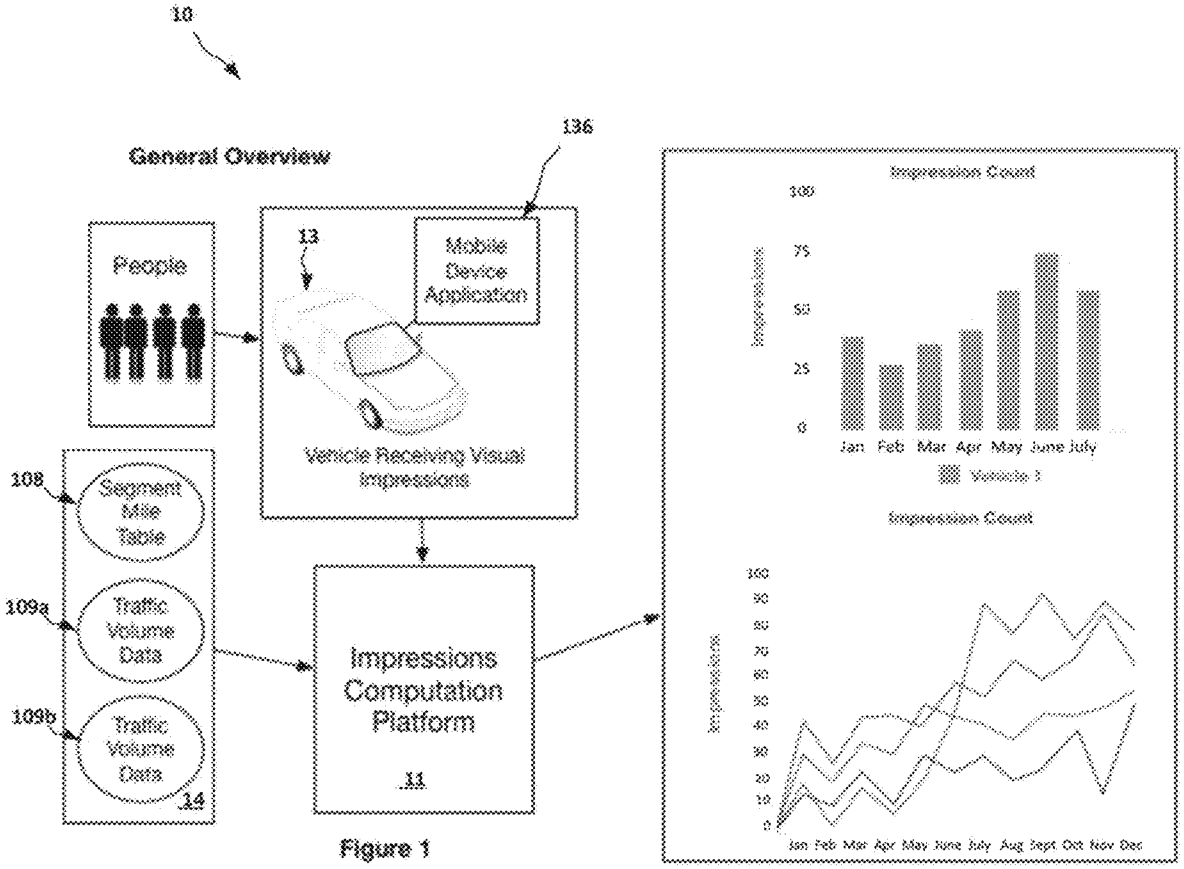
FIG. 1 provides an overview of a system for estimating visual impressions of vehicles configured with external graphic messaging and an associated representation of quantifiable visual impressions associated with a vehicle in the system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

System for Estimating Visual Impressions of Vehicles Bearing External Messaging FIG. 1 provides an overview of a system 10 for estimating visual impressions of vehicles configured with external graphic messaging and an associated representation of quantifiable visual impressions associated with a vehicle in the system. As shown, the system 10 includes an impressions computation platform 11 capable of receiving information from a plurality of mobile device applications 136 associated with a plurality of vehicles 13 (represented in FIG. 1 by a single mobile device application and a single vehicle, respectively).

In one embodiment a removable canvas bearing graphic messaging is applied to each of the vehicles 13. In this way a given vehicle may be configured to convey different messaging over different time periods (e.g., the messaging conveyed by the vehicle may be changed every few months). In one embodiment the removable canvas comprises one or more film-based panels or segments configured to adhere to exterior surfaces of the vehicles 13. For example, the removable canvas may be in the form of a vinyl wrap or other media wrap/adhesive. Alternatively, one or more of the vehicles 13 may be equipped with digital signage capable of conveying the desired messaging.

The mobile device application 136 associated with each vehicle 13 is generally executed by a mobile communication device owned or controlled by an operator of the vehicle. In other embodiments the mobile device applications 136 may be executed by mobile communication devices integrated within the vehicles 13. As shown, the system 10 further includes a database 14 containing a segment mile table 108, a historical traffic volume table 109*a* and/or a real-time traffic volume data 109*b*.

During operation of the system of FIG. 1, one or both of historical and real time vehicle traffic volume for a geographic location (latitude and longitude) are used in producing a value representing the number of vehicles within a "road segment" within a distance of point A to point B. Utilizing a mobile device application 136 and tracking GPS latitude and longitude, time of day, and speed, while in a vehicle as it travels from point A to point B, the platform 11 may cross reference that travelled path with the calculated number of vehicles in multiple road segments making up the path of point A to point B based on the historical and real time traffic volume. The result is a quantifiable amount of visual impressions received from people in vehicles travelling by the target vehicle within the travelled road segments.

A parked vehicle can also derive from the calculated road segment. In particular, an estimate is made of the number of vehicles that have travelled past the parked vehicle and a number of visual impressions received by the parked vehicle is derived from the estimate.

Figure 2:
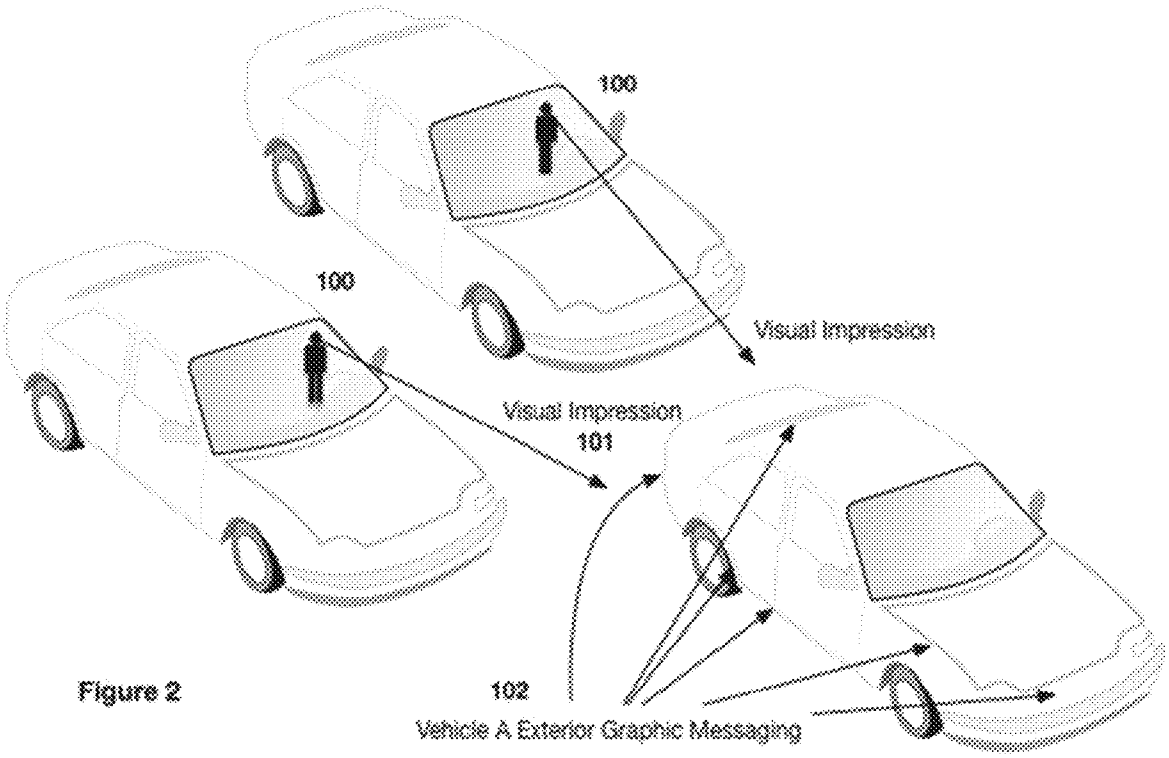
FIG. 2 illustrates visual impressions corresponding to visualization of a target vehicle with exterior graphic messaging.

FIG. 2 illustrates visual impressions corresponding to visualization of a target vehicle with exterior graphic messaging. In FIG. 2 people 100 in other vehicles are visually able to see 101 vehicle A's exterior graphic messaging 102. The people are in other vehicles 100 driving on the same road in either direction or freeway/highway. As discussed above, the exterior graphic messaging of Vehicle A 102 can be in the form of car vinyl wrap or other media wrap/adhesive, or viewable digital signage.

Figure 3:
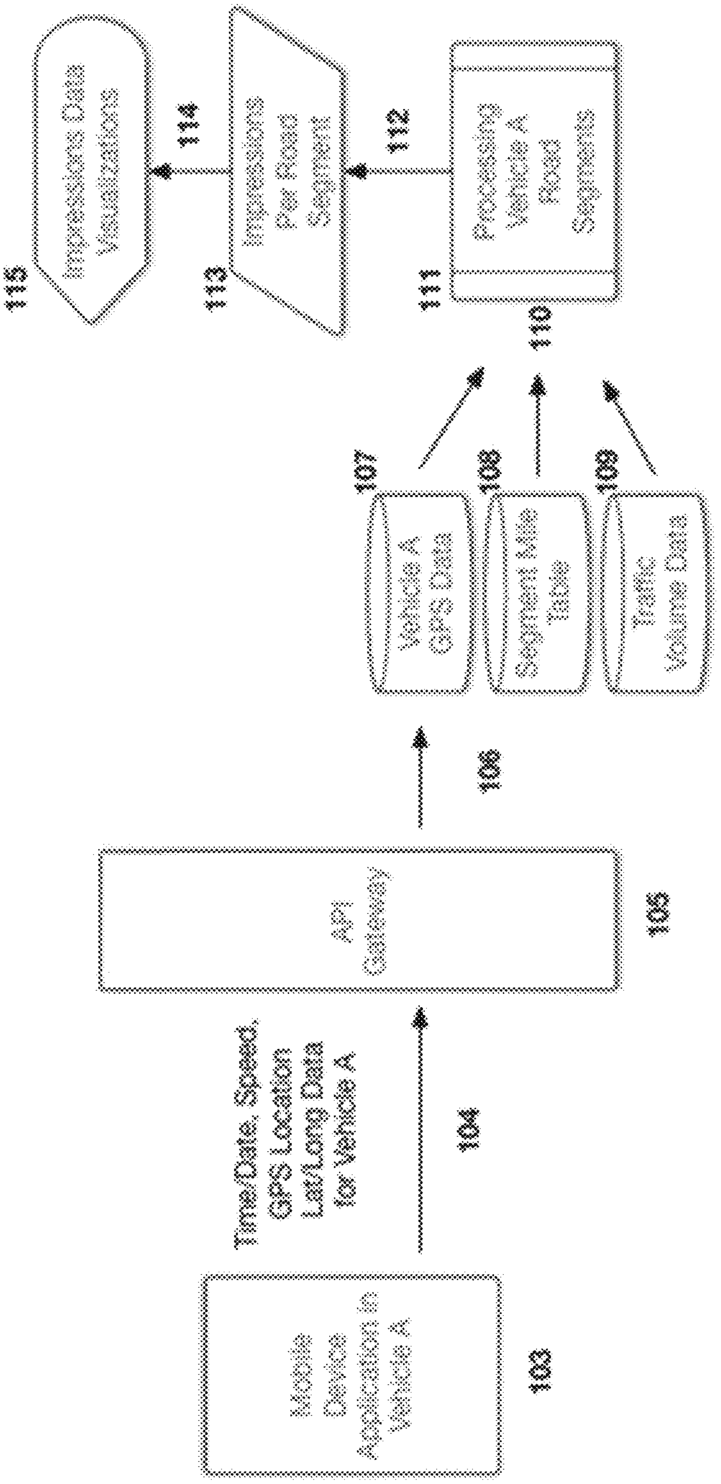
FIG. 3 is a flow chart of an exemplary workflow performed by a mobile device application in conjunction with a system platform.

Attention is now directed to FIG. 3, which is a flow chart of an exemplary workflow performed by a mobile device application in conjunction with a system platform. In the example of FIG. 3, mobile device 103 sends, to a platform API gateway 105 using a combination of GPS and cellular or Wi-Fi internet connectivity 104, GPS location latitude and longitude, speed, and time of day data for vehicle A every 1/10 of a mile travelled in real time. If Internet connectivity becomes unavailable, the GPS data is stored on the mobile device application 136 until Internet connectivity is re-established.

The API Gateway sends the data 106 to a database table 107 for storage and indexing of vehicle A location data. A segment mile database table 108 exists via imported shape files converted into a segment mile table. The segment mile database table 108 is cross referenced 110 with the vehicle A GPS data 107 and with a traffic volume table 109 in order to determine a number of cars and/or people are on the road for each segment driven 111. This in turn produces impressions per road segment 112, which is stored in a database table for vehicle A 113. The stored impressions information can be sent to any visualization system 114 and visualized 115.

Figure 4:
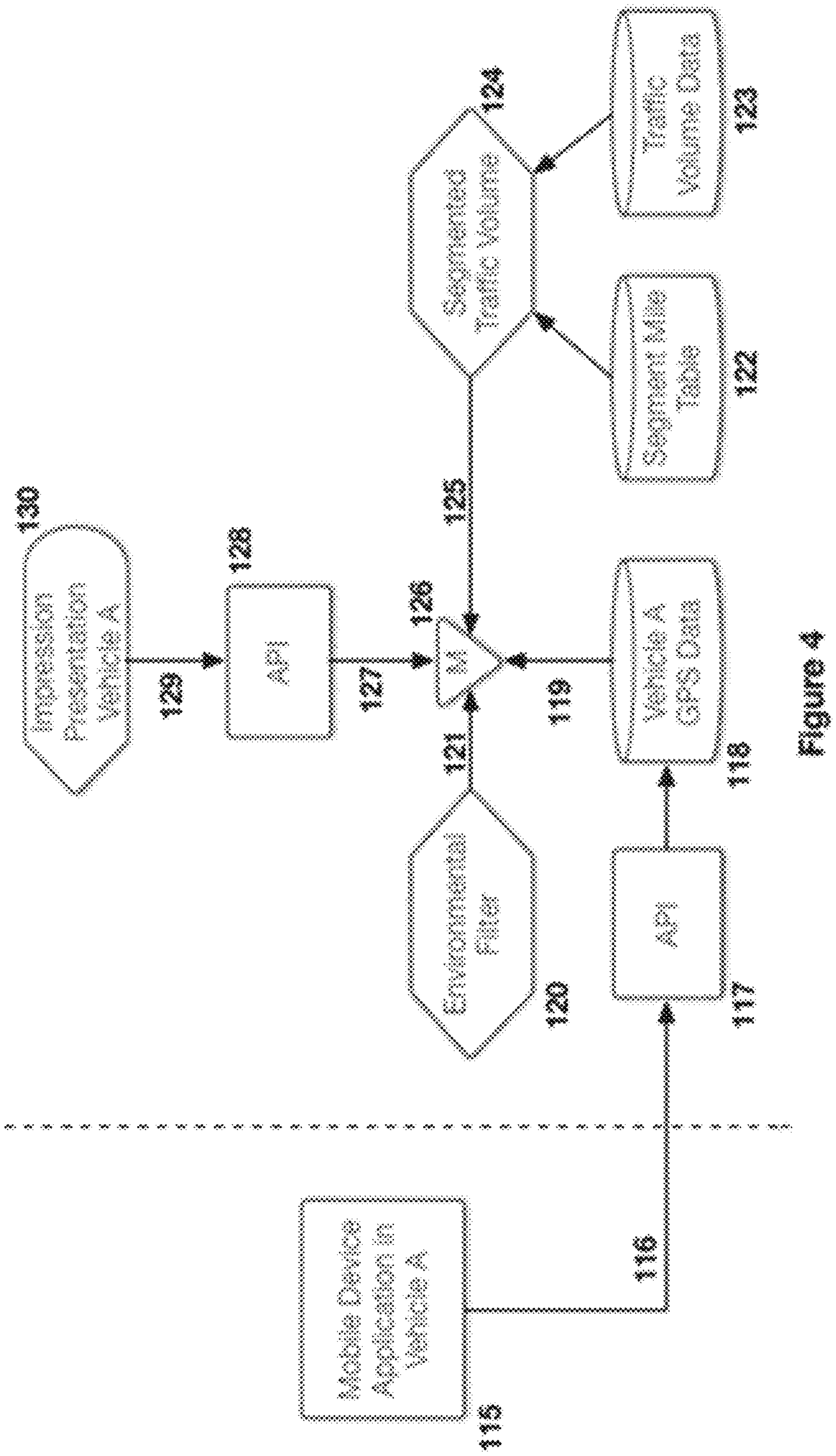
FIG. 4 is a flow chart of an exemplary platform impressions and scoring process capable of being implemented by the system of FIG. 1.

FIG. 4 is a flow chart of an exemplary platform impressions and scoring process. As shown, the exemplary process begins with the mobile device in vehicle A 115 sending GPS latitude and longitude, speed and time of day data every 1/10 of a mile 116 via posting to an API 117, which in turn stores the data in a database table 118. Another database table exists with segment mile data 122 derived from imported shape files (shp) correlating segment ID's with a certain mile distance. In order to import the shape file into the database, it is typically necessary to parse out the shape file into a comma separated file (csv) so as to import the data into the database. A separate database table holds traffic volume information indexed by segment ID 123. By referencing the segment mile table and the traffic volume data, a segmented traffic volume 124 can be derived. Combining 126 vehicle A GPS data 119 segmented traffic volume 125 and applying an environmental filter 121, an output is generated that is obtainable via an API 128 and thus retrievable 129 as a presentable set of impression data for vehicle A 130.

Figure 5:
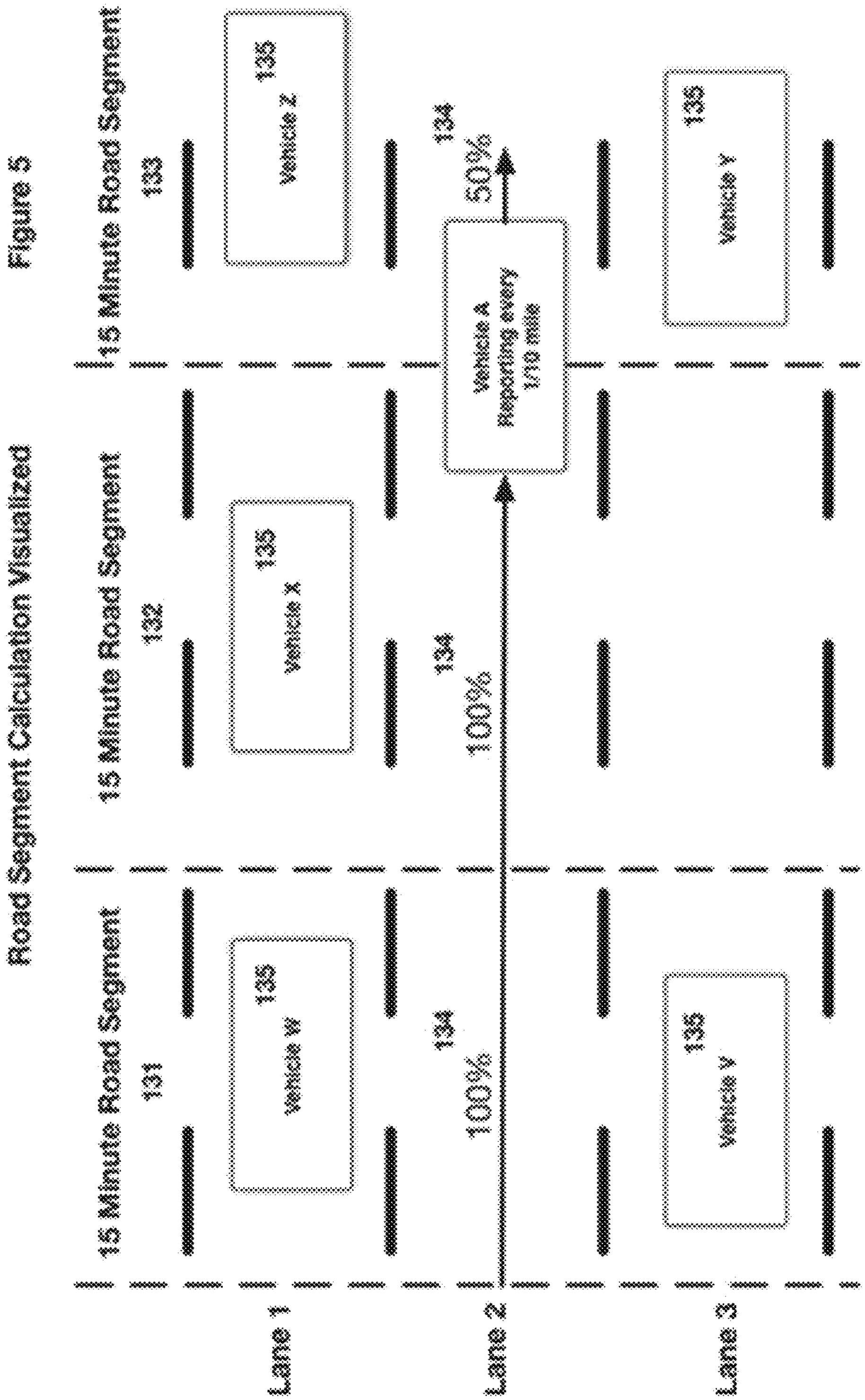
FIG. 5 provides an illustration of determination of a number of road segments traversed by a given vehicle.

FIG. 5 provides an illustration of determination of a number of road segments traversed by and associated with a given vehicle A. In the example of FIG. 5, the road segments 131 132 and 133 each represent a road segment of 15 minutes. Each road segment 131 132 and 133 is defined in a segment mile database table 122, which is indexed by road segment ID 122. As vehicle A travels through each road segment which, again, is a representation of 15 minutes of distance, a percentage 134 of segment completion by vehicle A is tracked. Each road segment may be associated with a number of vehicles 135 corresponding to, for example, the number of vehicles within the road segment at a given time. This number of vehicles may be determined in accordance with historical traffic data 123, real-time traffic data, or some combination thereof. In the specific case of FIG. 5, 3 road segments 131 132 and 133 have been traversed by vehicle A, where segments 131 and 132 have been 100% travelled and segment 133 has been 50% travelled. Segment 131 has 2 vehicles, segment 132 has 1 vehicle and segment 133 has 2 vehicles. Based on this segment traffic, vehicle A has received impressions from 4 vehicles. This assumes an exemplary approach in which estimates of the total number of vehicles capable of viewing vehicle A with each segment are added. Each such estimate may be obtained, for example, by using the percentage of each segment travelled by vehicle A in conjunction with historical data concerning the number of vehicles present within the relevant portions of the segment at the relevant times (i.e., the times at which vehicle A was positioned within various parts of the segment). Of course, other approaches to estimating visual impressions within road segments may be used. For example, in some implementation it may be sufficient to determine that a vehicle has simply been present within a road segment in order for the vehicle to be accorded visual impressions corresponding to some or all of the vehicles within the road segment.

The environmental filter 120 may take into consideration the distance a vehicle can see vehicle A (e.g., 250 feet) and adjust the impression value accordingly. For example, in the case of an estimated visibility of 250 feet, those potential impressions associated with vehicles in the segment more than 250 feet away from vehicle A are not counted in determining the number of impressions for the segment. This filtered number of impressions for the segment is then processed based on a score for vehicle A's miles that takes into account current speed as a ratio to free flow speed (traffic flow conditions) as well as time of day 104.

In some embodiments the environmental filter 120 may apply a formula based on the traffic score to account for the reduced exchange of unique vehicles which may occur during heavy to moderate traffic congestion, or during night time driving (decreased visibility distance) even when traffic is free flowing. In these embodiments a categorization scoring range of 1-12 may be used, with 1 being a low score (e.g., light traffic (low speed) or poor visibility) to 12 being a high score (e.g., higher traffic (high speed) and good visibility). The result of the adjustments 121 is an estimate of the number of unique vehicles capable of seeing the target vehicle within the travelled distance.

Attribution System for Moving Out-of-Home Advertising

When an occupant of a vehicle or other observer views an advertisement on the exterior of another moving vehicle, the occupant or observer may visit a business associated with the advertisement or otherwise perform an activity (e.g., visiting a website). Such visitation of the business or performing of an activity in response to viewing an advertisement is generally known as a conversion. A conversion may correspond to purchase of a product but may also involve other interactions with a business. The extent to which such conversions are attributable to advertisements on moving vehicles would be of interest to advertisers. However, existing systems are not configured to measure such attribution.

As is discussed below, the present attribution system is designed to build an exposed audience of users known to have been proximate tracked paths of vehicles displaying external graphic messaging within a geo-fenced area. A control audience of users is developed by determining users known to have been within the geo-fenced area but not within a defined range of such tracked paths. A first set of conversion events performed by the exposed audience with respect to a business or other entity associated with the displayed messaging (e.g., advertising) is determined. Similarly, a second set of conversion events performed by the control audience is also determined. At least one attribution metric based upon the first set of conversion events and the second set of conversion events may then be calculated.

Figure 6:
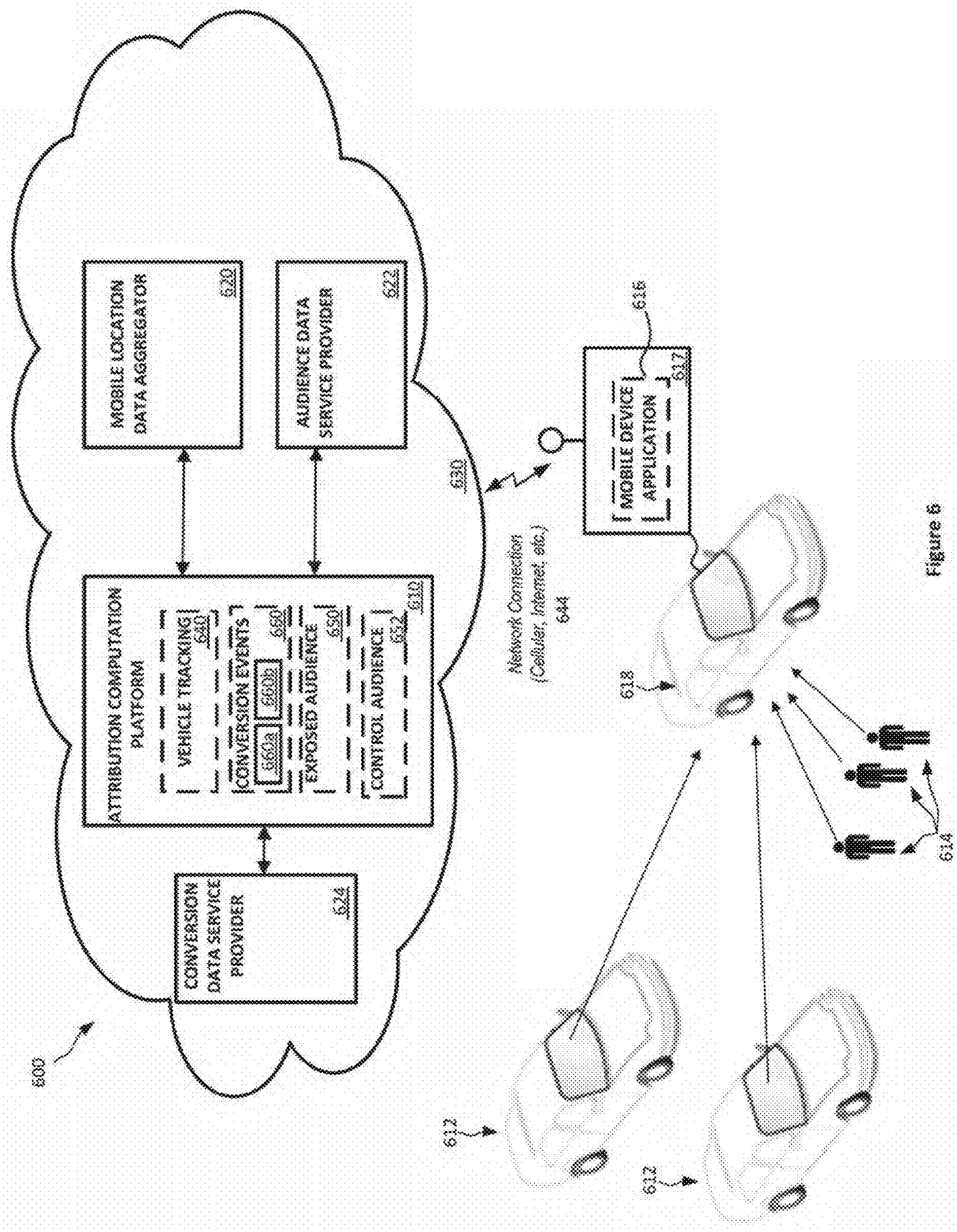
FIG. 6 provides an overview of an attribution system for measuring an extent to which an advertising campaign involving vehicles configured with external graphic messaging influences conversion events relating to a product, service or other activity associated with the campaign.

FIG. 6 provides an overview of an attribution system 600 for measuring an extent to which an advertising campaign involving vehicles configured with external graphic messaging influences conversion events relating to a product, service or other activity associated with the campaign. As shown, the system 600 includes an attribution computation platform 610 capable of receiving information from a plurality of mobile device applications 616 associated with a plurality of vehicles 618 configured with external graphic messaging (represented in FIG. 6 by a single mobile device application and a single vehicle, respectively). The mobile device applications 616 may each be executed by, for example, a mobile device 617 in the possession of a driver of the respective vehicle 618. As is discussed below, the attribution computation platform 610 is in communication with a mobile location data aggregator 620, an audience data service provider 622 and a conversion data service provider 624.

In one embodiment a removable canvas bearing graphic messaging is applied to each of the vehicles 618. In this way a given vehicle may be configured to convey different messaging to occupants of other vehicles 612 or other persons 614 over different time periods (e.g., the messaging conveyed by the vehicle may be changed every few months). In one embodiment the removable canvas comprises one or more film-based panels or segments configured to adhere to exterior surfaces of the vehicles 618. For example, the removable canvas may be in the form of a vinyl wrap or other media wrap/adhesive. Alternatively, one or more of the vehicles 618 may be equipped with digital signage capable of conveying the desired messaging. In other embodiments "topper" signage may be attached to the roof or other external surface of the vehicles 618.

The mobile device application 616 associated with each vehicle 618 is generally executed by a mobile communication device owned or controlled by an operator of the vehicle 618. In other embodiments the mobile device applications 616 may be executed by mobile communication devices integrated within the vehicles 618. The vehicles 612 each include one or more occupants, some of which may also possess mobile communication devices for which location information as a function of time may be available. Similarly, at least some of the persons 614 may also carry mobile communication devices for which time-stamped location information can be obtained.

In the embodiment of FIG. 6, the platform 610 and/or the mobile location data aggregator 620, audience data service provider 622 and conversion data service provider 624 may be implemented using "cloud" computing capabilities 630. As is known, cloud computing may be characterized as a model for facilitating on-demand network access to a shared pool of configurable computing resources (e.g., networks, servers, storage, applications, and services) that can be rapidly provisioned and released with minimal management effort or service provider interaction. Cloud systems tend to automatically control resource use by utilizing some form of metering capability with respect to, for example, storage, processing, bandwidth, and active user accounts. Various cloud service models are possible, including cloud software as a service (Saas), cloud platform as a service (PaaS), and cloud infrastructure as a service (IaaS).

In other embodiments the platform 610 and/or the mobile location data aggregator 620, audience data service provider 622, and conversion data service provider 624 may be implemented by using on-premise servers and other infrastructure rather than by using cloud-based services. Alternatively, hybrid implementations of the attribution computation platform 610 including a combination of on-premise and cloud-based infrastructure are also within the scope of the present disclosure.

During operation of the system 600 of FIG. 6, mobile device application 616 tracks GPS latitude and longitude and time of day while the vehicle 618 is traveling or at rest. During this time the external graphic messaging carried by the vehicle 618 may receive visual impressions from the occupants of the other vehicles 612 or the other persons 614 within an exposure radius of the vehicle. Mobile device 617 sends, to a vehicle tracking gateway and database 640 using a combination of GPS and cellular or Wi-Fi internet connectivity 644, GPS location latitude and longitude data and time of day data for its associated vehicle 618. In one embodiment this data is provided for every 1/10 of a mile travelled in real time. Measurements of vehicle speed may optionally also be provided. If Internet connectivity becomes unavailable, the GPS data is stored on the mobile device application 616 until Internet connectivity is re-established.

Figure 7:
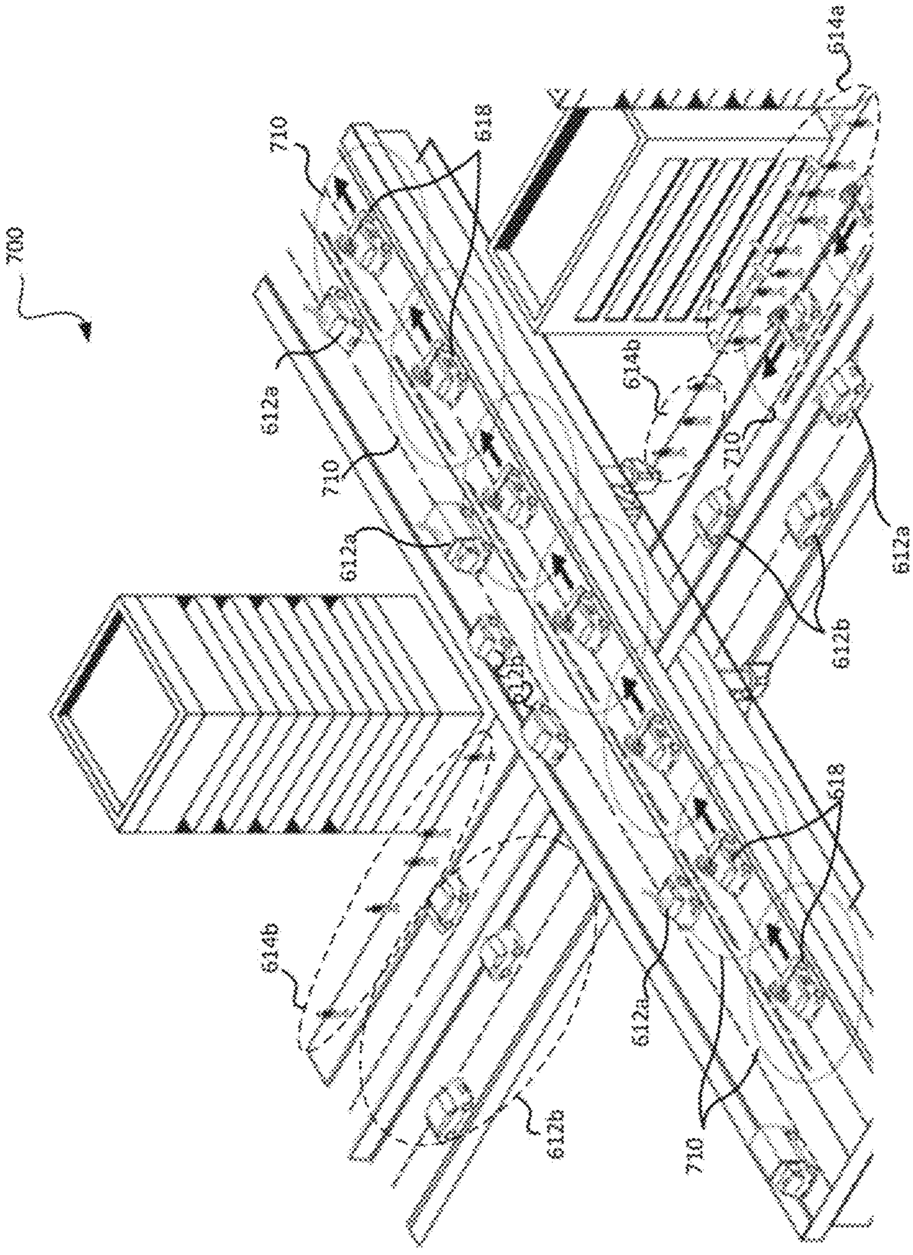
FIG. 7 illustrates an urban environment in which the attribution system of the present disclosure may be implemented to gauge the effectiveness of external graphic messaging displayed by vehicles.

Attention is now directed to FIG. 7, an illustration is provided of an urban environment 700 in which the attribution system of the present disclosure may be implemented to gauge the effectiveness of external graphic messaging (e.g., advertisements) displayed by vehicles 618. As shown, a circular exposure zone 710 having an exposure radius (e.g., 50 feet) surrounds each vehicle. As is discussed below, vehicles 612*a* and persons 614*a* that come within an exposure zone 710 associated with a particular external graphic message form an exposed audience 650 and vehicles 612*b* and persons 614*b* within a geofenced area that do not come within an exposure zone 710 for that particular external graphic message form a control, or "not exposed", audience 652. For clarity of presentation it is assumed that the same external graphic messaging is displayed by the vehicles 618 in FIG. 7, it being understood that in general different vehicles 618 will be associated with different campaigns and display different external graphic messaging corresponding to each of the campaigns. It will be appreciated that, in general, when the vehicles 618 are outfitted to display external graphic messaging for different campaigns, the exposed audience 650 and the control audience 652 will be different for each such campaign. The size of the exposure radius is configurable and may vary depending upon, for example, the size of the font used on the external graphic messaging carried by a vehicle 618 (e.g., larger font sizes would be associated with correspondingly larger exposure radii).

Figure 8:
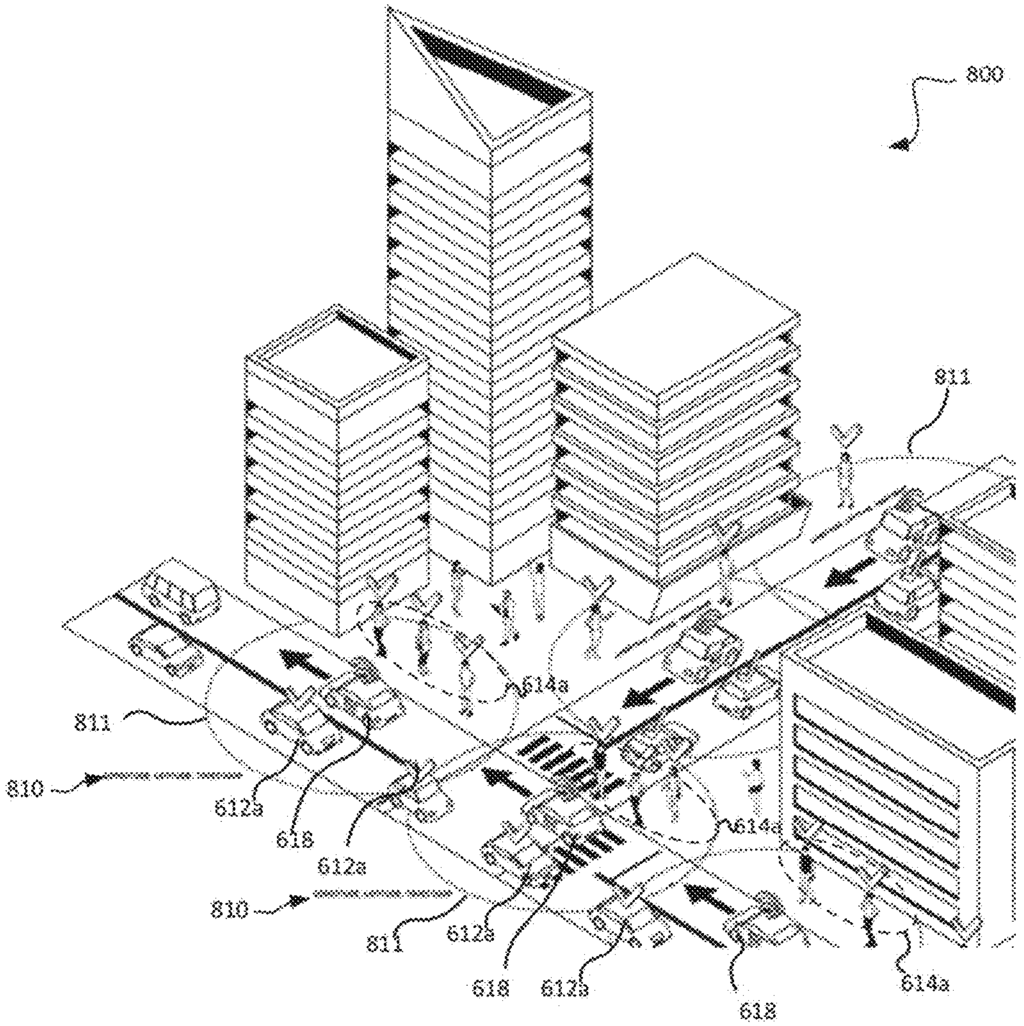
FIG. 8 provides a street level view of an urban environment in which the attribution system of the present disclosure may be implemented to gauge the effectiveness of external graphic messaging displayed by vehicles.

In one embodiment each member of the exposed audience 650 and each member of the control audience 652 is identified by information such as a mobile advertising ID ("mobile ad ID"). An exemplary manner in which the platform 610 builds the exposed audience 650 and the control audience 652 in cooperation with the mobile location data aggregator 620 and the audience data service provider 622 is described hereinafter FIG. 8 provides a street level view of an urban environment 800 in which the attribution system of the present disclosure may be implemented to gauge the effectiveness of external graphic messaging displayed by vehicles 618. As is indicated by FIG. 8, information 810 including latitude, longitude and a timestamp associated with exposure zones 811 is captured by the mobile device application associated with each vehicle 618 at regular intervals of distance travelled (e.g., every 1/10$^{th}$ of a mile). Each exposure zone 811 encompasses one of the time-stamped locations included within the information 810 and is of an area (e.g., a circular area) associated with a defined radius. In one embodiment the defined radius is selected based upon a font size or other characteristic of the messaging displayed by the vehicles 618.

Figure 9:
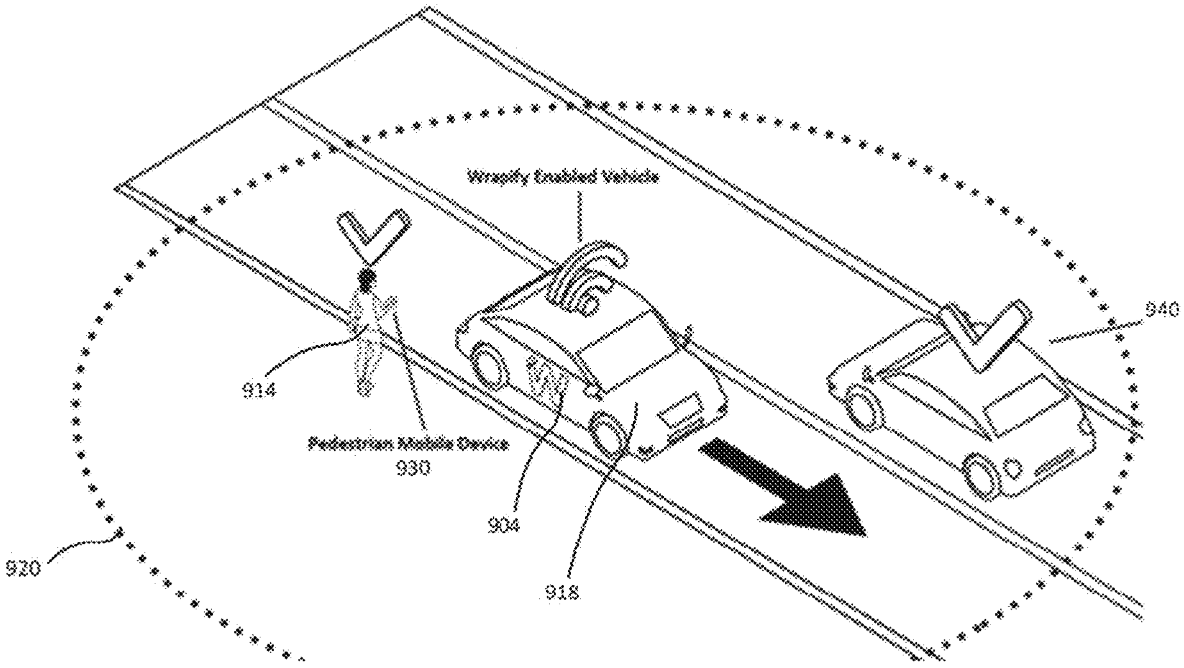
FIG. 9 is a focused, perspective view of a road segment associated with a single exposure zone which may be used in attribution determinations in accordance with the disclosure.

FIG. 9 is a focused, perspective view of a road segment associated with a single exposure zone which may be used in attribution determinations in accordance with the disclosure. As shown, a vehicle 918 is configured to display exterior graphic messaging 904 visible to at least one person 914 within a exposure zone 920 associated with the vehicle 918. The person 914 is in possession of a mobile communication device 930 for which location information may be available and utilized in the manner described hereinafter. An additional vehicle 940 is also present within the exposure zone 920 and may include an occupant having a mobile communication device for which location information may also be obtained and used as described herein.

Figure 10:
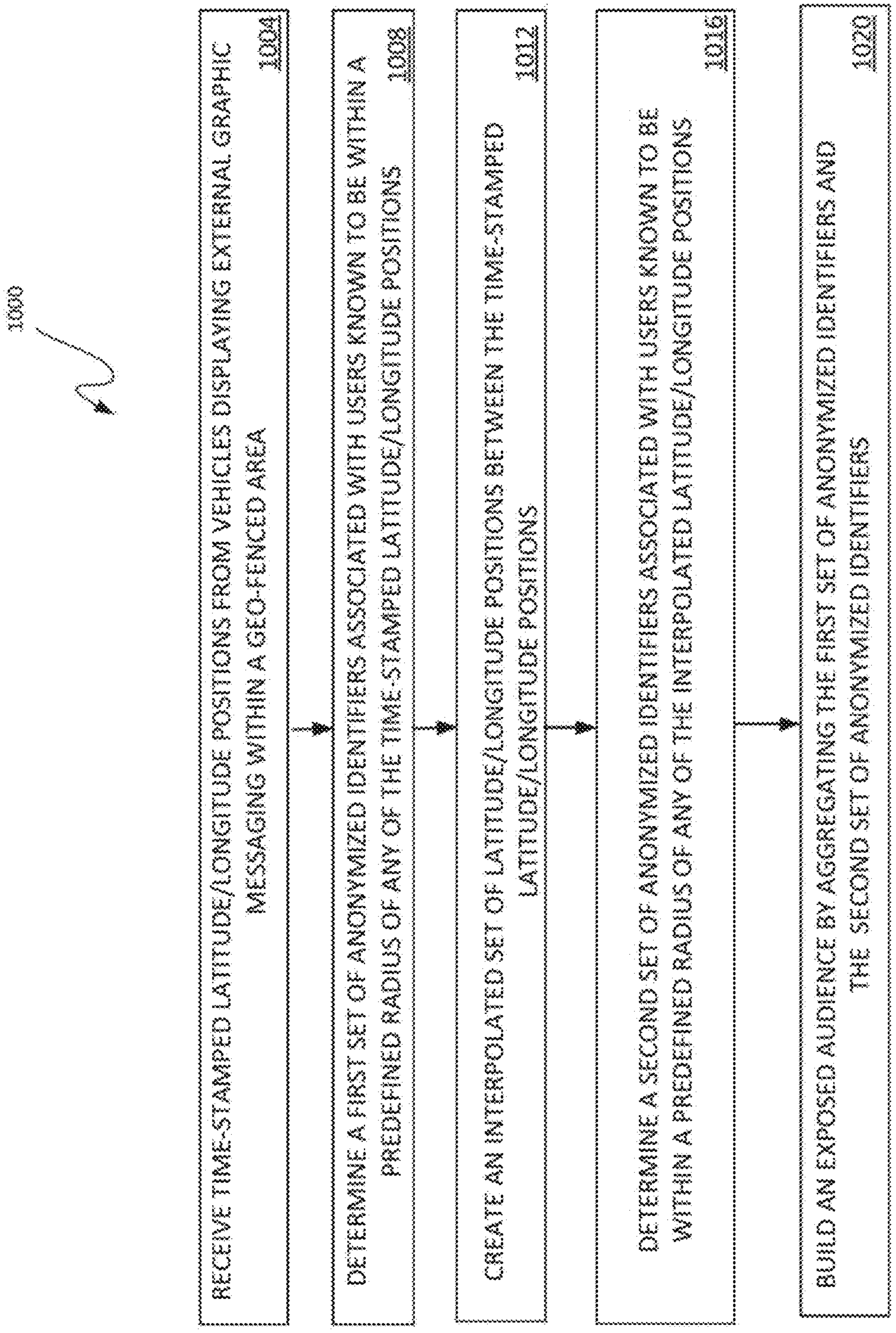
FIG. 10 is a flowchart illustrating a process for building an exposed audience for use in attribution determinations in accordance with the disclosure.

Attention is now directed to FIG. 10, which is a flowchart illustrating a process 1000 for building an exposed audience for use in attribution determinations in accordance with the disclosure. The process 1000 includes receiving time-stamped latitude/longitude positions from vehicles displaying external graphic messaging within a geo-fenced area (stage 1004). A first set of anonymized identifiers associated with mobile device users (either pedestrians or occupants of other vehicles) known to be within a radius of any of the time-stamped latitude/longitude positions is determined (stage 1008). An interpolated set of latitude/longitude positions is created between the time-stamped latitude/longitude positions (stage 1012). A second set of anonymized identifiers is determined where the second set of anonymized identifiers are associated with mobile device users known to be within a radius of any of the interpolated latitude/longitude positions (stage 1016). The process 1000 further includes building an exposed audience by aggregating the first set of anonymized identifiers and the second set of anonymized identifiers (stage 1020) in order to form the union of the first set of anonymized identifiers and the second set of anonymized identifiers. The exposed audience corresponds to a set of mobile device users known to have been physically present at locations relatively near (i.e., within a distance of less than the radius) the vehicles displaying external graphic messaging within the geo-fenced area.

With regard to stages 1008 and 1016, in one embodiment the first set of anonymized identifiers and the second set of anonymized identifiers correspond to mobile advertisement IDs (mobile ad IDs). Currently, there exist two main types of mobile ad IDs. Apple devices utilize a mobile ad ID known as Identifier for Advertising (IDFA) and devices based upon Google's Android operating system use a mobile ad ID known as the Google Advertising ID (AAID). The mobile location data aggregator 620, which may be a third-party service, maintains a database of mobile ad IDs as a function of location and time. Accordingly, by providing the time-stamped location data received by the vehicle tracking gateway 640 to an API of the mobile location data aggregator 620, mobile ad IDs of mobile devices present within the exposure zones associated with the vehicles 618 are returned to the attribution computation platform 610.

With regard to stage 1012, when a given vehicle 618 is traveling at a reasonable speed (e.g., is not in heavy traffic) and the vehicle provides time-stamped location data for approximately every $1/10^{th}$ of a mile of one or more road segments traversed by the vehicle 618, this information should generally be sufficient to obtain mobile ad IDs for essentially all mobile devices capable of viewing the vehicle 618 during its traversal of the road segments. However, in cases in which a vehicle is traveling very slowly (e.g., is in heavy traffic), it may be necessary to generate a set of interpolated time-stamped location data and also provide this to the API of the mobile location data aggregator 620 in order to obtain mobile ad IDs for essentially all mobile devices positioned to view the vehicle 618 while it is traveling. This is because when the vehicle 618 is traveling slowly a relatively large amount of time may elapse between consecutive time-stamped locations if such locations are spaced by approximately $1/10^{th}$ of a mile. As a result, mobile devices within other vehicles may come within the exposure radius of the vehicle 618 during the time it is traversing between successive time-stamped reporting locations separated by $1/10^{th}$ of a mile but may not be within the exposure radius at the times when the vehicle 618 records its location (i.e., generates time-stamped location data for provision to the vehicle tracking gateway 640 either in real time or in a batch process). Under these conditions the data aggregator 620 may not return the mobile ad IDs corresponding to the mobile devices within these other vehicles; that is, the exposed audience associated with a particular vehicle 619 could be undercounted. In order to remedy this situation the platform 610 could, when the time-stamped location data received from a vehicle 618 indicates that the vehicle 618 is traveling slowly (e.g., below a defined speed such as 15 MPH), create an interpolated set of time-stamped location data in which one or more interpolated time-stamped locations are created between each time-stamped location reported by the vehicle 618. As a simple example, if one interpolated time-stamped location were to be created roughly halfway between each reported time-stamped location, then the combined reported and interpolated time-stamped location data provided to the mobile location data aggregator 620 would be comprised of time-stamped locations separated by approximately $1/20^{th}$ of a mile (assuming the reported time-stamped locations were separated by approximately $1/10^{th}$ of a mile).

Figure 11:
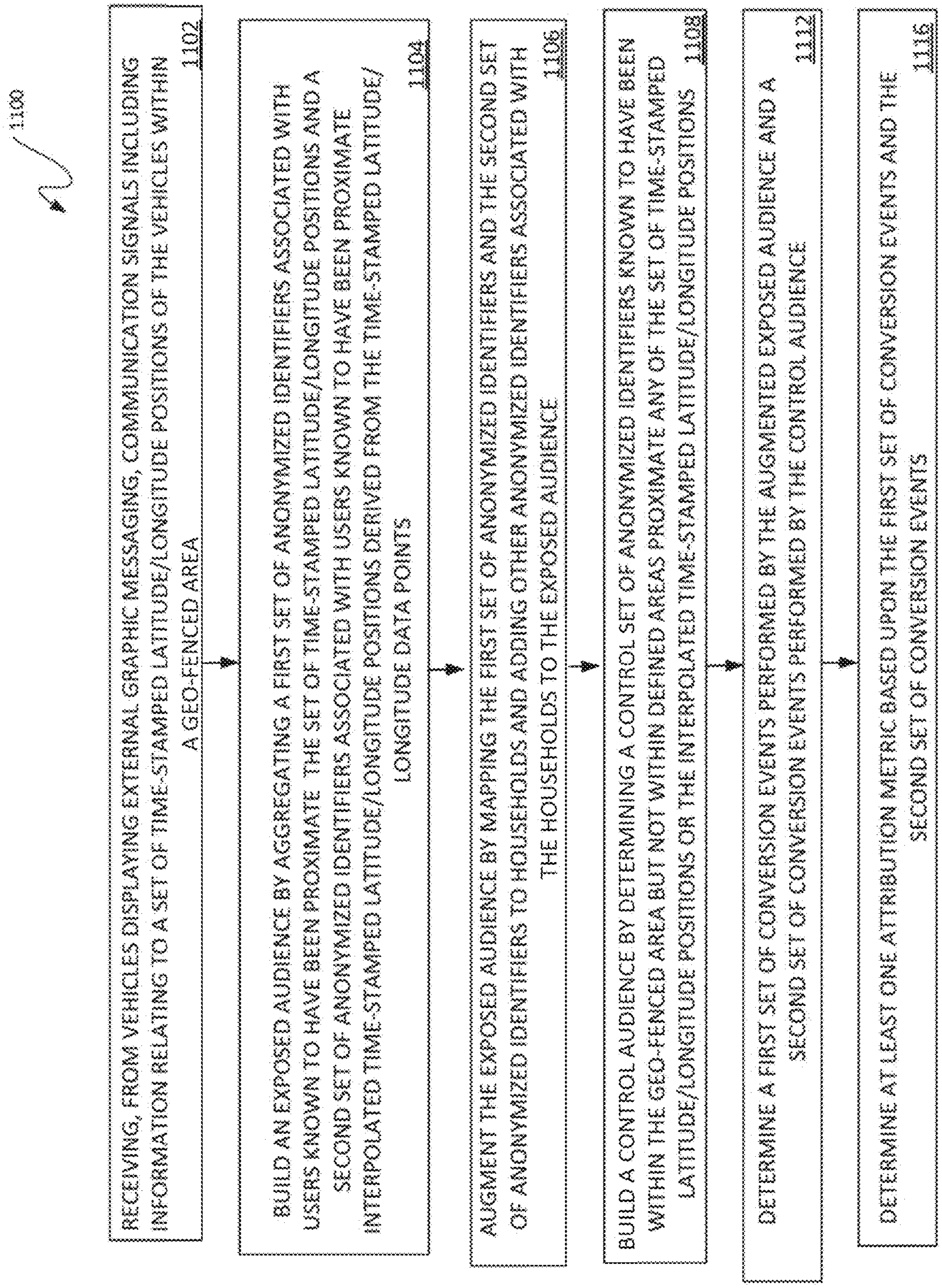
FIG. 11 is a flowchart is provided of a process for determining at least one attribution metric associated with advertising or other messaging externally displayed by vehicles.

Turning now to FIG. 11, a flowchart is provided of a process 1100 for determining at least one attribution metric associated with advertising or other messaging externally displayed by vehicles 618. As is discussed in further detail below, the process 1100 includes receiving, from a plurality of vehicles 618, communication signals including information relating to a set of time-stamped latitude/longitude positions of the plurality of vehicles within a geo-fenced area (stage 1102). The process 1100 further includes building an exposed audience by aggregating (i) a first set of anonymized identifiers associated with users known to have been proximate the set of time-stamped latitude/longitude positions received from the vehicles 618 and (ii) a second set of anonymized identifiers associated with users known to have been proximate interpolated time-stamped latitude/longitude positions derived from the time-stamped latitude/longitude data points (stage 1104). The geo-fenced area may comprise, for example, a portion of a city or county, or a geographic region bounded by roadways and/or natural features.

With regard to stage 1104, in one embodiment the first set of anonymized identifiers and the second set of anonymized identifiers correspond to an aggregated set of mobile ad IDs provided by the mobile location data aggregator 620. This aggregated set of mobile ad IDs may then be provided by the platform 610 to the audience data service provider 622. In one embodiment the audience data service provider 622 maps each mobile ad ID within the aggregated set of mobile ad IDs to a particular household. Any other mobile ad IDs associated with the households identified through this process are then added to the aggregated set of mobile ad IDs in the exposed audience 650 in order to form an augmented exposed audience (stage 1106). This may be done to ensure that the conversion events 660 associated with a particular advertisement displayed by one or more vehicles 618 appropriately reflect the influence of the displayed advertisement on subsequent consumer behavior. For example, consider the case in which a commuter having a mobile device associated with a particular mobile ad ID views a displayed advertisement on a vehicle 618 during the commuter's evening commute. Upon arriving at home, the commuter may make a purchase of a product or take some other action related to the advertisement using a device having a different mobile ad ID or may cause a family member to do so using another device. In either case, unless the mobile ad IDs associated with the other devices in the commuter's household are included within the set of mobile ad IDs used to measure attribution, the conversion events 660 will not reflect the influence of the advertisement on the product purchase or other actions taken at the commuter's household.

The process 1100 further includes building a control audience by determining a control set of anonymized identifiers known to have been within the geo-fenced area but not within defined areas proximate any of the set of time-stamped latitude/longitude positions or the interpolated time-stamped latitude/longitude positions (stage 1108). In one embodiment the platform 610 facilitates building the control audience by providing the set reported and interpolated latitude/longitude positions to the audience data service provider 622. In turn, the service provider 622 typically acquires (from one or more third party services) the mobile ad IDs which were within a defined geo-fenced area but not within the exposure radius of the vehicle 618 of interest during the time duration spanned by the time-stamped latitude/longitude data.

The process 1100 also includes compiling conversion events 660 including a first set of conversion events 660*a* performed by the augmented exposed audience with respect to an advertisement externally displayed by a vehicle 618 and a second set of conversion events 660*b* performed by the control audience (stage 1112). These conversion events 660 may relate to, for example, a purchase of a product or service associated with the advertisement, a physical visit to a merchant associated with the product or service, or navigation to a website corresponding to the product or service. Information relating to the conversion events 660 may be provided to the platform 610 by, for example, monitoring activity on a website or a mobile application ("app") operated by a customer of an entity operating the attribution system 600 (e.g., a company that has contracted to advertise a product using the vehicles 618). For example, data relating to the conversion events 660 could include a list of mobile ad IDs associated with electronic devices used to (i) navigate to a landing page of a website identified by a URL included within the advertisement, or (ii) perform one or more actions within a mobile app operated by a company responsible for running the advertisement. In addition, data relating to the conversion events 660 could include a record of customer "foot traffic" at a particular physical location (e.g., particular retail locations). Information relating to the conversion events 660 could also be provided by the conversion data service provider 624.

At least one attribution metric based upon the first set of conversion events 660*a* and the second set of conversion events 660*b* may then be determined (stage 1116). For example, an attribution metric termed offline to online attribution may be determined. In this case, the conversion events 660*a* performed by the exposed audience and the conversion events 660*b* performed by the control audience correspond to firing a pixel on (or otherwise interacting with) a particular page of a website. For example, the page could comprise a "shopping cart" or "checkout" page of a website operated by the entity running the advertisement. The attribution metric in this case may correspond to the percentage of the exposed audience firing the website pixel relative to the percentage of the control audience firing the pixel.

In the case of a mobile app, the conversion events 660*a* performed by the exposed audience and the conversion events 660*b* performed by the control audience correspond to interaction with the mobile app. In one embodiment a measurement tool is used to monitor such interaction. Such tools (e.g., Kochava or AppsFlyer) enable monitoring of events occurring within the app on a particular mobile device. This permits an advertiser utilizing the system 600 to specify that particular events (e.g., "new user created") be monitored for both the exposed and control audiences. Thus, an attribution metric relating to the ratio of new users of the app from the exposed audience relative to new users of the app from the control audience may be determined using the conversion events 660*a* and 660*b* relating to such creation of new users.

Attribution based upon retail foot traffic may involve, for example, determining the percentage of the exposed audience that visits a particular location relative to the percentage of a control audience that visits the location within some time period following display of an advertisement by vehicles 618. For example, consider an advertisement displayed by vehicles 618 which promotes a particular professional sports team. In this case the conversion events 660*a* and 660*b* may relate to the physical presence of members of the exposed audience and the control audience, respectively, at a venue (e.g., a stadium or arena) associated with the sports team. The physical presence of members of the exposed and control audiences at the venue may be determined by, for example, using data provided by the mobile location data aggregator 620.

In one embodiment each attribution metric determined by the platform 610 may utilized a "look back" window of a defined period of time (e.g., 30 days) to ensure that the conversion events 660*a* and 660*b* represent the first time that a member of the exposed or control audiences has interacted with the relevant website or mobile app or visited the relevant physical location. This prevents "double counting" of individuals previously utilizing the relevant website or mobile app or which have previously visited the relevant physical location.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded into one or more different computers or other processors to implement various aspects of the present disclosure as discussed above.

The terms "program" or "software" or "code" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for audience building for use within an attribution determination system including a plurality of vehicles having exteriors configured to convey messaging to occupants of other vehicles, the method comprising:

receiving, at a vehicle tracking gateway, communication signals including information relating to time-stamped locations of the plurality of vehicles wherein the communication signals are provided by at least one of mobile devices disposed within the plurality of vehicles and communication devices integrated with the plurality of vehicles;

providing, to an application programming interface (API) of a mobile location data aggregator from a first plurality of remote devices, first time-stamped location data including a first plurality of the time-stamped locations, wherein the first time-stamped location data is determined by a first GPS receiver associated with each of the first plurality of remote devices;

determining that a travel speed for at least one of the first plurality of remote devices fall below a threshold based on the first time-stamped location data;

receiving, from the mobile location data aggregator, a first set of anonymized identifiers associated with the first plurality of remote devices, wherein each of the first set of anonymized identifiers is associated with the first GPS receiver, wherein the first plurality of remote devices is determined to be within a first plurality of exposure zones associated with the first plurality of time-stamped locations, based on the first time-stamped location data, wherein each of the first plurality of exposure zones encompasses one of the first plurality of time-stamped locations and is of a first area associated with a first radius and a geo-fenced area;

in response to determining that the travel speed for the at least one of the first plurality of remote devices falls below a threshold, creating a first set of interpolated locations between at least a subset of the first plurality of time-stamped locations, wherein the first set of interpolated locations is based on a time lapse between one or more of the first plurality of time-stamped locations;

providing, to the API of the mobile location data aggregator, the first set of interpolated locations;

receiving, from the mobile location data aggregator, a second set of anonymized identifiers, wherein each of the second set of anonymized identifiers is associated with a second GPS receiver associated with each of the second plurality of remote devices, wherein the second plurality of remote devices is determined to be within the first radius of ones of the first set of interpolated locations based on comparing a second-time stamp location data determined by the second GPS receiver associated with each of the second plurality of remote devices to each of the first set of interpolated locations;

in response to determining the second plurality of remote devices is within the first radius of one of the first set of interpolated locations, aggregating the first set of anonymized identifiers and the second set of anonymized identifiers in order to build a first exposed audience wherein the first exposed audience corresponds to a union of the first set of anonymized identifiers and the second set of anonymized identifiers;

determining a control audience, wherein the control audience comprises a third set of anonymized identifiers associated with the geo-fenced area which excludes the union of the first set of anonymized identifiers and the second set of anonymized identifiers, wherein each of the third set of anonymized identifiers is associated with a third GPS receiver associated with each of a third plurality of remote devices, wherein the third plurality of remote devices is determined to be within the geo-fenced area based on the third GPS receiver; and determining a conversion event based on the control audience.

2. The method of claim 1 wherein the first radius is selected based at least in part upon a first font size associated with at least a part of the messaging on the exteriors of a first set of the plurality of vehicles.

3. The method of claim 1 wherein the first plurality of time-stamped locations are included within the communication signals associated with a first set of the plurality of vehicles and wherein at least a part of the messaging on the exteriors of the first set of the plurality of vehicles is of a first font size, the first radius being selected based at least in part upon the first font size.

4. The method of claim 1, further including:

creating a second set of interpolated locations between the second plurality of time-stamped locations;

providing, to the API of the mobile location data aggregator, the second set of interpolated locations;

receiving, from the mobile location data aggregator, a fourth set of anonymized identifiers where the fourth set of anonymized identifiers are associated with mobile device users known to be within the second radius of ones of the second set of interpolated locations;

aggregating the third set of anonymized identifiers and the fourth set of anonymized identifiers in order to build a second exposed audience wherein the second exposed audience corresponds to a union of the third set of anonymized identifiers and the fourth set of anonymized identifiers.

5. The method of claim 1 further including making a determination, based upon the first time-stamped location data, that the subset of the first plurality of time-stamped locations are associated with one or more vehicles traveling below a defined speed wherein the first set of interpolated locations are created in response to the determination.

6. A method for attribution determination in a system including a plurality of vehicles having exteriors configured to convey messaging to occupants of other vehicles, the method comprising:

receiving, at a vehicle tracking gateway, communication signals including information relating to time-stamped locations of the plurality of vehicles, the time-stamped locations corresponding to a plurality of exposure zones wherein the communication signals are provided by at least one of mobile devices disposed within the plurality of vehicles and communication devices integrated with the plurality of vehicles;

providing, to an application programming interface (API) of a mobile location data aggregator from a first plurality of remote devices, first time-stamped location data including a first plurality of the time-stamped locations, wherein the first time-stamped location data is determined by a first GPS receiver associated with each of the first plurality of remote devices;

determining that a travel speed for at least one of the first plurality of remote devices fall below a threshold based on the first time-stamped location data;

receiving, from the mobile location data aggregator, a first set of anonymized identifiers associated with the first plurality of remote devices, where each of the first set of anonymized identifiers is associated with the first GPS receiver, wherein the first plurality of remote devices is determined to be within a first plurality of exposure zones associated with the first plurality of time-stamped locations, based on the first time-stamped location data, wherein each of the first plurality of exposure zones encompasses one of the first plurality of time-stamped locations and is of a first area associated with a first radius and wherein the first plurality of remote devices determined to be within the first plurality of exposure zones are included within a first exposed audience;

in response to determining that the travel speed for the at least one of the first plurality of remote devices falls below a threshold, creating a first set of interpolated locations between at least a subset of the first plurality of time-stamped locations, wherein the first set of interpolated locations is based on a time lapse between one or more of the first plurality of time-stamped locations and the first exposed audience is within a first radius of one of the first set of interpolated locations;

providing, to the API of the mobile location data aggregator, the first set of interpolated locations;

receiving a first control set of anonymized identifiers associated with a control plurality of remote devices determined to be within a first geo-fenced area and excluded from the first plurality of exposure zones and the first set of interpolated locations based on control time-stamped location data received from a control GPS receiver associated with each of the control plurality of remote devices, the first control set of anonymized identifiers corresponding to a first control audience;

compiling a first record of conversion events wherein the conversion events include a first set of conversion events performed by the first exposed audience with respect to the messaging conveyed by a first set of the plurality of vehicles and a second set of conversion events performed by the first control audience; and determining at least a first attribution metric based upon the first set of conversion events and the second set of conversion events.

7. The method of claim 6, further including:

creating a first set of interpolated locations between at least a subset of the first plurality of time-stamped locations;

providing, to the API of the mobile location data aggregator, the first set of interpolated locations;

receiving, from the mobile location data aggregator, a second set of anonymized identifiers associated with mobile device users known to be within a second plurality of exposure zones associated with the first set of interpolated locations wherein each of second plurality of exposure zones encompasses one location of the first set of interpolated locations and is of the first area and wherein the mobile device users known to be within the second plurality of exposure zones are also included within the first exposed audience;

wherein the building the first control audience further includes determining a second control set of anonymized identifiers associated with users known to have been within the first geo-fenced area but not within the second plurality of exposure zones.

8. The method of claim 6 wherein the first radius is selected based at least in part upon a first font size associated with at least a part of the messaging on the exteriors of a first set of the plurality of vehicles.

9. The method of claim 6 wherein the first plurality of time-stamped locations are included within the communication signals associated with a first set of the plurality of vehicles and wherein at least a part of the messaging on the exteriors of the first set of the plurality of vehicles is of a first font size, the first radius being selected based at least in part upon the first font size.

10. The method of claim 9, further including:

providing, to the API of the mobile location data aggregator, second time-stamped location data including a second plurality of the time-stamped locations;

receiving, from the mobile location data aggregator, a second set of anonymized identifiers associated with a second exposed audience comprised of mobile device users known to be within a second plurality of exposure zones associated with the second plurality of time-stamped locations wherein the second plurality of time-stamped locations are included within the communication signals associated with a second set of the plurality of vehicles and wherein at least a part of the messaging on the exteriors of the second set of the plurality of vehicles is of a second font size different from the first font size, the second radius being selected based at least in part upon the second font size wherein the second radius is different from the first radius;

building a second control audience by determining a second control set of anonymized identifiers associated with users known to have been within a second geo-fenced area but not within the second plurality of exposure zones;

compiling a second record of conversion events wherein the conversion events include a second set of conversion events performed by the second exposed audience with respect to the messaging conveyed by a second set of the plurality of vehicles and a third set of conversion events performed by the second control audience; and determining a second attribution metric based upon the second set of conversion events and the second set of conversion events.

11. The method of claim 6 wherein the messaging includes an advertisement and wherein the first set of conversion events relate to at least one of a purchase of a product or service associated with the advertisement, a physical visit to a merchant associated with the product or service, and navigation to a website corresponding to the product or service.

12. An attribution computation platform for use in a system including a plurality of vehicles having exteriors configured to convey messaging to occupants of other vehicles, the attribution platform comprising:

one or more processors;

a communication interface; and a memory including instructions which, when executed by the one or more processors, cause the one or more processors to:

receive communication signals including information relating to time-stamped locations of the plurality of vehicles, the time-stamped locations corresponding to a plurality of exposure zones wherein the communication signals are provided by at least one of mobile devices disposed within the plurality of vehicles and communication devices integrated with the plurality of vehicles;

provide, to an application programming interface (API) of a mobile location data aggregator from a first plurality of remote devices, first time-stamped location data including a first plurality of the time-stamped locations, wherein the first time-stamped location data is determined by a first GPS receiver associated with each of the first plurality of remote devices;

determine that a travel speed for at least one of the first plurality of remote devices fall below a threshold based on the first time-stamped location data;

receive, from the mobile location data aggregator, a first set of anonymized identifiers associated with the first plurality of remote devices, wherein each of the first set of anonymized identifiers is associated with the first GPS receiver, wherein the first plurality of remote devices is determined to be within a first plurality of exposure zones associated with the first plurality of time-stamped locations, based on the first time-stamped location data, wherein each of the first plurality of exposure zones encompasses one of the first plurality of time-stamped locations and is of a first area associated with a first radius and wherein the first plurality of remote devices is determined to be within the first plurality of exposure zones are included within a first exposed audience;

in response to determining that the travel speed for the at least one of the first plurality of remote devices falls below a threshold, create a first set of interpolated locations between at least a subset of the first plurality of time-stamped locations, wherein the first set of interpolated locations is based on a time lapse between one or more of the first plurality of time-stamped locations and the first exposed audience is within a first radius of one of the first set of interpolated locations;

provide, to the API of the mobile location data aggregator, the first set of interpolated locations;

receive a first control set of anonymized identifiers associated with a control plurality of remote devices determined to be within a first geo-fenced area and excluded from the first plurality of exposure zones and the first set of interpolated locations based on control time-stamped location data received from a control GPS receiver associated with each of the control plurality of remote devices, the first control set of anonymized identifiers corresponding to a first control audience;

compile a first record of conversion events wherein the conversion events include a first set of conversion events performed by the first exposed audience with respect to the messaging conveyed by a first set of the plurality of vehicles and a second set of conversion events performed by the first control audience; and determining at least a first attribution metric based upon the first set of conversion events and the second set of conversion events.

13. The method of claim 1, wherein each of the control plurality of remote devices is determined to provide an input relative to a pixel on a website associated with the conversion event.

14. The method of claim 1, wherein at least one of the plurality of vehicles has a driver.

* * * * *